US007269139B1

(12) United States Patent
Williams, Jr. et al.

(10) Patent No.: US 7,269,139 B1
(45) Date of Patent: Sep. 11, 2007

(54) METHOD AND APPARATUS FOR AN ADAPTIVE RATE CONTROL MECHANISM REACTIVE TO FLOW CONTROL MESSAGES IN A PACKET SWITCHING SYSTEM

(75) Inventors: John J. Williams, Jr., Pleasanton, CA (US); Thomas Dejanovic, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 884 days.

(21) Appl. No.: 09/894,199

(22) Filed: Jun. 27, 2001

(51) Int. Cl.
*H04L 12/26* (2006.01)

(52) U.S. Cl. ..................................... 370/235

(58) Field of Classification Search ........ 370/232–236, 370/236.1–2, 249, 253, 465, 229–230, 230.1
See application file for complete search history.

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,260 A | 12/1986 | Toy et al. | |
| 4,734,907 A | 3/1988 | Turner | |
| 4,829,227 A | 5/1989 | Turner | |
| 4,849,968 A | 7/1989 | Turner | |
| 4,893,304 A | 1/1990 | Giacopelli et al. | |
| 4,901,309 A | 2/1990 | Turner | |
| 5,127,000 A | 6/1992 | Henrion | |
| 5,173,897 A | 12/1992 | Schrodi et al. | |
| 5,179,551 A | 1/1993 | Turner | |
| 5,179,556 A | 1/1993 | Turner | |
| 5,229,991 A | 7/1993 | Turner | |
| 5,253,251 A | 10/1993 | Aramaki | |
| 5,260,935 A | 11/1993 | Turner | |
| 5,339,311 A | 8/1994 | Turner | |
| 5,400,329 A * | 3/1995 | Tokura et al. | 370/232 |
| 5,402,415 A | 3/1995 | Turner | |
| 5,842,040 A | 11/1998 | Hughes et al. | |
| 6,192,029 B1 * | 2/2001 | Averbuch et al. | 370/229 |
| 6,424,624 B1 * | 7/2002 | Galand et. | 370/231 |

(Continued)

OTHER PUBLICATIONS

Douglas Comer, Internetworking With TCP/IP, 2000, 4th Ed., Prentice Hall, pp. 232-237.

(Continued)

*Primary Examiner*—Chi Pham
*Assistant Examiner*—Anh-Vu Ly
(74) *Attorney, Agent, or Firm*—The Law Office of Kirk D. Williams (57) ABSTRACT

Methods and apparatus are disclosed for an adaptive rate control mechanism reactive to flow control messages in a packet switching system and other communications and computer systems. Typically, a multiplicative increase and exponential decrease technique is used to throttle traffic. Backpressure feedback is used to calculate the initial rate at which to allow traffic after backpressure is deasserted. This reduces the probability of underrun of buffers (e.g., too little traffic being carried). The adjustment to the initial rate is made by measuring the time between the XON and XOFF in factor periods. Then a target XON time is subtracted. If the result is positive (i.e., the measured XON time was too long), the rate is multiplicatively increased (e.g., by a factor of two to the difference). If the result is negative (i.e., the measured XON time was too short), the rate is exponentially decreased (e.g., by the square root).

47 Claims, 6 Drawing Sheets

U.S. PATENT DOCUMENTS

| | | | |
|---|---|---|---|
| 6,452,903 B1 * | 9/2002 | Peck et al. | 370/235 |
| 6,466,541 B1 * | 10/2002 | Peck | 370/229 |
| 6,581,100 B1 * | 6/2003 | Durin et al. | 370/236 |
| 6,628,613 B1 * | 9/2003 | Joung et al. | 370/230 |
| RE38,309 E * | 11/2003 | Frazier et al. | 370/231 |
| 6,657,961 B1 * | 12/2003 | Lauffenburger et al. | 370/231 |
| 6,882,622 B1 * | 4/2005 | Donoghue | 370/229 |
| 6,965,566 B2 * | 11/2005 | Kawasaki et al. | 370/235 |
| 7,012,889 B1 * | 3/2006 | Turner et al. | 370/229 |
| 7,042,842 B2 * | 5/2006 | Paul et al. | 370/229 |
| 7,061,868 B1 * | 6/2006 | Ahlfors et al. | 370/236 |

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

* cited by examiner

METHOD AND APPARATUS FOR AN ADAPTIVE RATE CONTROL MECHANISM REACTIVE TO FLOW CONTROL MESSAGES IN A PACKET SWITCHING SYSTEM

FIELD OF THE INVENTION

This invention relates to packet switching systems; and more particularly, the invention relates to an adaptive rate control mechanism reactive to flow control messages in a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Consumers and designers of these systems typically desire high reliability and increased performance at a reasonable price. As non-blocking packet switching fabrics are typically expensive and non-scalable to large packet switching systems, many packet switching fabrics are designed such that internal congestion might arise depending on traffic loads and patterns. It is important for packet switching systems that can have internal congestion to handle the congestion in some manner, such as using buffers and generating and communicating flow control information (e.g., XON, XOFF signals) to sending sources so they can decrease the traffic load and allow the congestion to subside. However, known methods of reacting to flow controls signals can lead to poor traffic throughput, such as that produced by a synchronized on and off oscillation of sending sources.

For example, in a typical switching fabric, it is possible for certain destination ports to be oversubscribed. This creates a bottleneck where traffic becomes backlogged behind the congestion point. The backpressure threshold must be set low enough so that congested traffic does not occupy so many buffers that starvation can occur on other unrelated destinations. The peak occupancy is then dependent on the aggregate ingress traffic rate to that destination as there is a delay in the backpressure feedback loop where the occupancy can overshoot the threshold. Another problem that can occur is if the occupancy drains too quickly before traffic can be resumed. This can cause underrun and effective loss of speedup through the fabric. Moreover, the traffic can have a variable number of sources, yielding a very wide range in offered load. Known systems and methods do not adequately react to traffic conditions. Needed are new methods and apparatus for reacting to flow control signals by traffic sources.

SUMMARY OF THE INVENTION

Systems and methods are disclosed for an adaptive rate control mechanism reactive to flow control messages in a packet switching system. One embodiment receives a start flow control signal and a stop flow control signal. A timing difference is then determined between the receipt of the start flow control signal and the stop flow control signal. An initial rate is then determined based at least in part on the determined difference.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for an adaptive rate control mechanism reactive to flow control messages in a packet switching system which also may be used, inter alia, in other computer and communications systems, including, but not limited to a router or network. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, networks, computer and/or communication devices or mechanisms, or combinations of components thereof. The term "computer" is used generically herein to describe any number of computers, including, but not limited to personal computers, embedded processors, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

In controlling the occupancy of buffers in a packet switching system, one embodiment manages the occupancy overshoot by having buffer occupancy as a function of time approximate a constant exponential curve as the occupancy crosses the backpressure threshold. One embodiment accomplishes this by having the rate of traffic allowed at the traffic sources double every factor period. This typically causes the occupancy to follow an exponential curve leading to a constant average overshoot.

Additionally, one embodiment uses backpressure feedback to calculate the initial rate at which to allow traffic after backpressure is deasserted. This reduces the probability of underrun. The adjustment to the initial rate is made by measuring the time between the XON and XOFF in factor periods. Then a target XON time is subtracted. If the result is positive (i.e., the measured XON time was too long), the rate is increased by a factor of two to the difference. If the result is negative (i.e., the measured XON time was too short), the rate is decreased by the square root. The following equations show the relationship between these variables in one embodiment:

if(Measured $XON$>Target $XON$)log rate+=Measured $XON$-Target $XON$ if(Measured $XON$<Target $XON$)log rate/=2

Initial Rate=$2^{\wedge}$ log Rate

Some embodiments use variants of these equations, including, but not limited to those embodiments using standard, linear, logarithmic, and/or other modes of calculation.

Figure 1A:
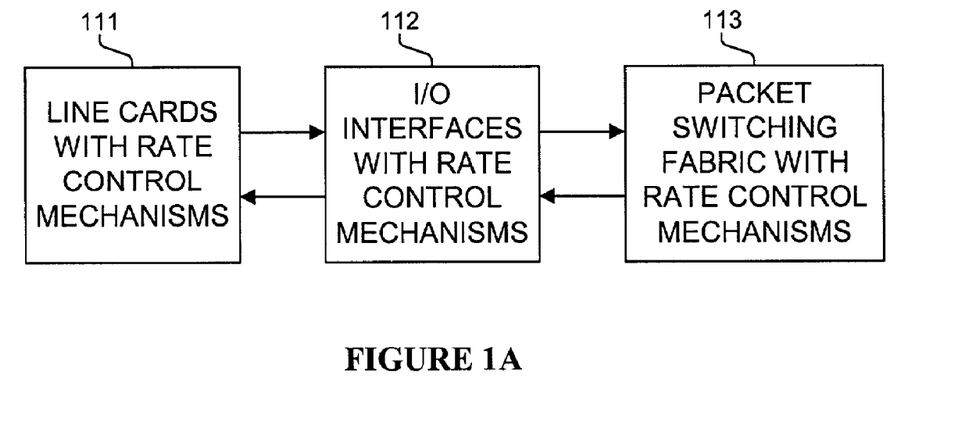
FIGS. 1A-B are block diagrams of exemplary embodiments of systems incorporating the adaptive rate control mechanism reactive to flow control messages.

FIG. 1A illustrates an exemplary packet switching system using one or more embodiments of an adaptive rate control mechanism reactive to flow control messages as described herein. Illustrated are line cards 111, input/output interfaces 112 and packet switching fabric 113. Depending on the embodiment, one or more components 111-113 may use a rate control mechanism reactive to flow control messages. For example, in various embodiments, an adaptive rate control mechanism is used only in line cards 111 or in input/output interfaces 112.

Figure 1B:
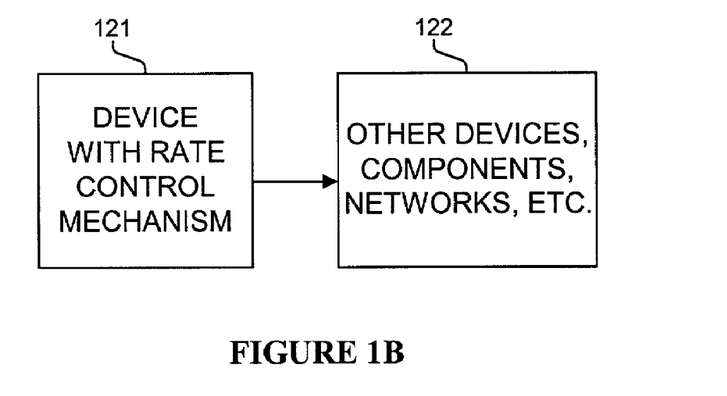

FIG. 1B illustrates another embodiment of a system using an adaptive rate control mechanism reactive to flow control messages as described herein. Illustrated are a device 121 which communicates with another unit 122 (e.g., other devices, components networks, etc.) For example, device 121 could be any sending source, such as a component of a packet switching system (e.g., line card, I/O interface, switching element), communications system (e.g., router, network, switch), computer system, or any other device, and unit 122 could be any receiving source such as a component of a packet switching system (e.g., line card, I/O interface, switching element), communications system (e.g., router, network, switch), computer system, or any other device.

Figure 2A:
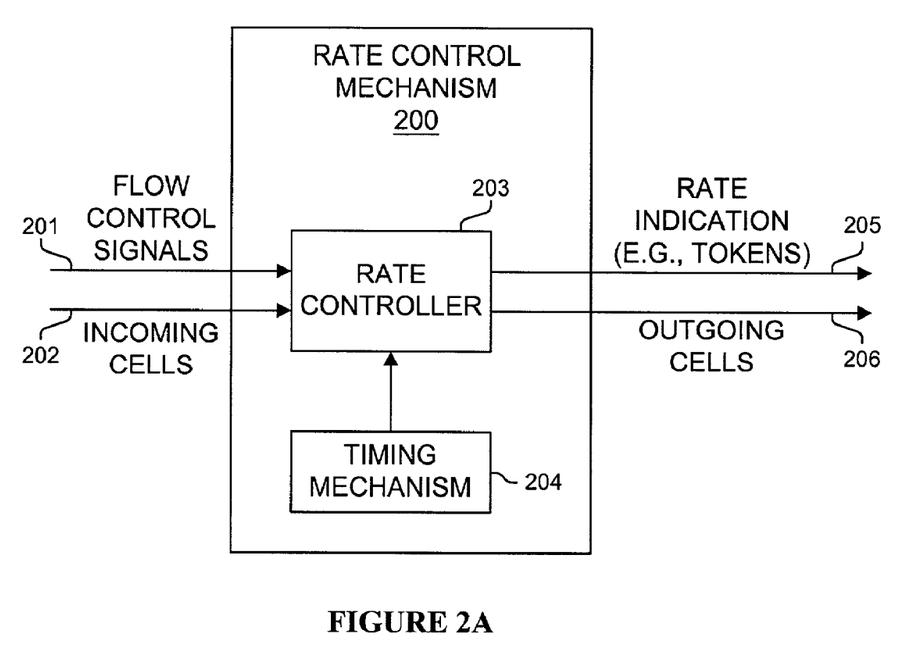
FIGS. 2A-B are block diagrams illustrating exemplary embodiments of rate control mechanisms.

FIG. 2A illustrates one embodiment of a rate control mechanism 200, including a rate controller 203. Rate control mechanism receives and reacts to flow control signals 201. A timing mechanism 204 (e.g., a clock, interrupt, pulse generator, etc.) produces signals to allow rate controller 203 to determine a relative time duration. Timing mechanism 204 is shown in FIG. 2A to be internal to rate control mechanism 200. In other embodiments, timing mechanism 204 is external to rate control mechanism 200. Rate controller 203, produces a rate indication 205 (e.g., tokens or other signal) according to the adaptive rate control mechanism described herein. In one embodiment, rate control mechanism 200 receives and buffers cells or packets over link 202, and then forwards these buffered cells or packets over link 206 at a rate according to the present invention (in place of, or in addition to rate indication 205).

Figure 2B:
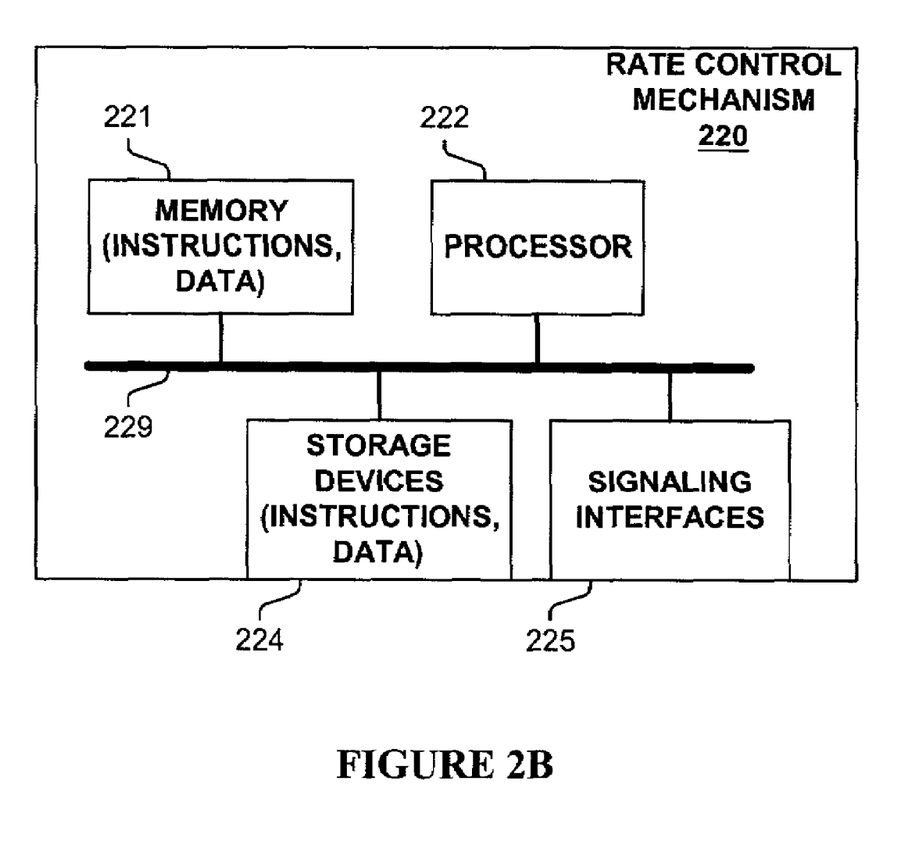

FIG. 2B illustrates one embodiment of an adaptive rate control mechanism 220 reactive to flow control messages as described herein. As shown, rate control mechanism 220 comprises a processor 222, memory 221, storage devices 224, and signaling interfaces 225, which are electrically coupled via one or more communications mechanisms 229 (shown as a bus for illustrative purposes). Rate control mechanism 220 typically receives flow control information over signaling interfaces 225, and generates a rate indication or sends packets also from signaling interfaces 225.

The operation of rate control mechanism 220 is typically controlled by processor 222 using memory 221 and storage devices 224, and communications interface 305. Memory 221 is one type of computer-readable medium, and typically comprises random access memory (RAM), read only memory (ROM), integrated circuits, and/or other memory components. Memory 221 typically stores computer-executable instructions to be executed by processor 222 and/or data which is manipulated by processor 222 for implementing functionality in accordance with the invention. Storage devices 224 are another type of computer-readable medium, and typically comprise disk drives, diskettes, networked services, tape drives, and other storage devices. Storage devices 224 typically store computer-executable instructions to be executed by processor 222 and/or data which is manipulated by processor 222 for implementing functionality in accordance with the invention.

As used herein and contemplated by the invention, computer-readable medium is not limited to memory and storage devices; rather computer-readable medium is an extensible term including memory, storage device, and/or other storage mechanism that can be used to tangibly embody computer-executable instructions or data.

Figure 3A:
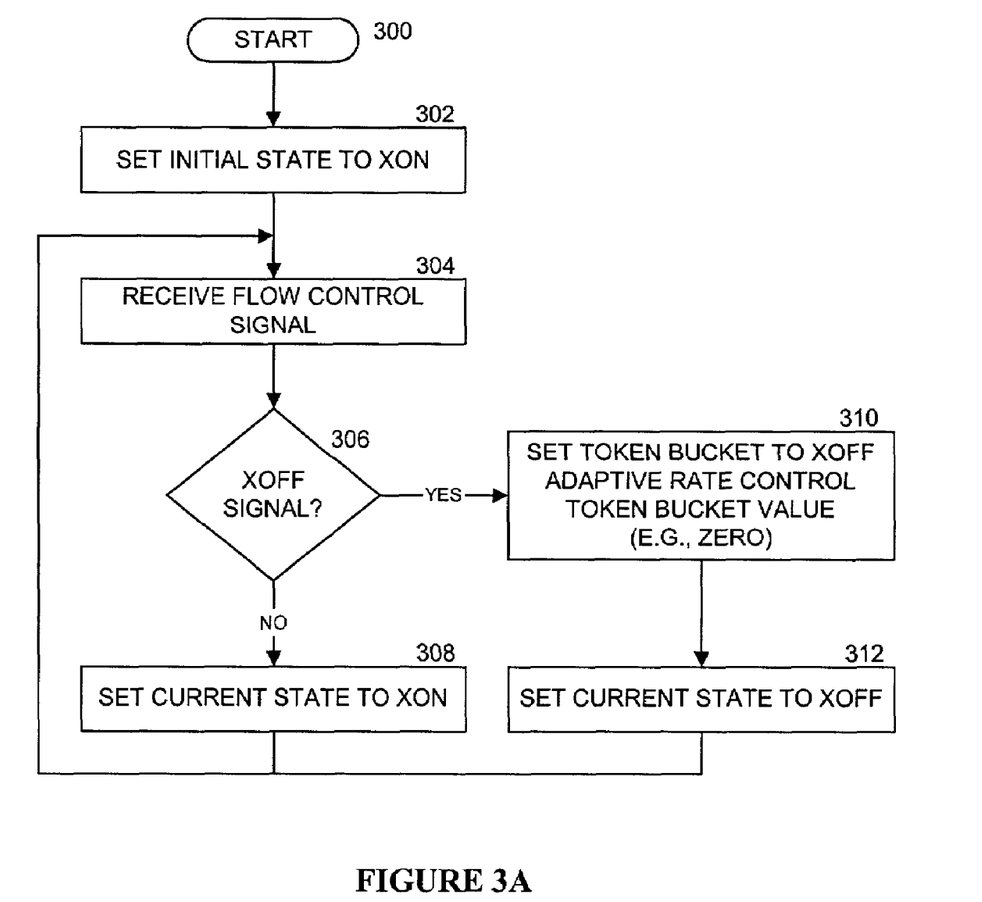
FIGS. 3A-C are flow diagrams illustrating one embodiment of a set of processes for an adaptive rate control mechanism reactive to flow control messages in a packet switching system.
Figure 3B:
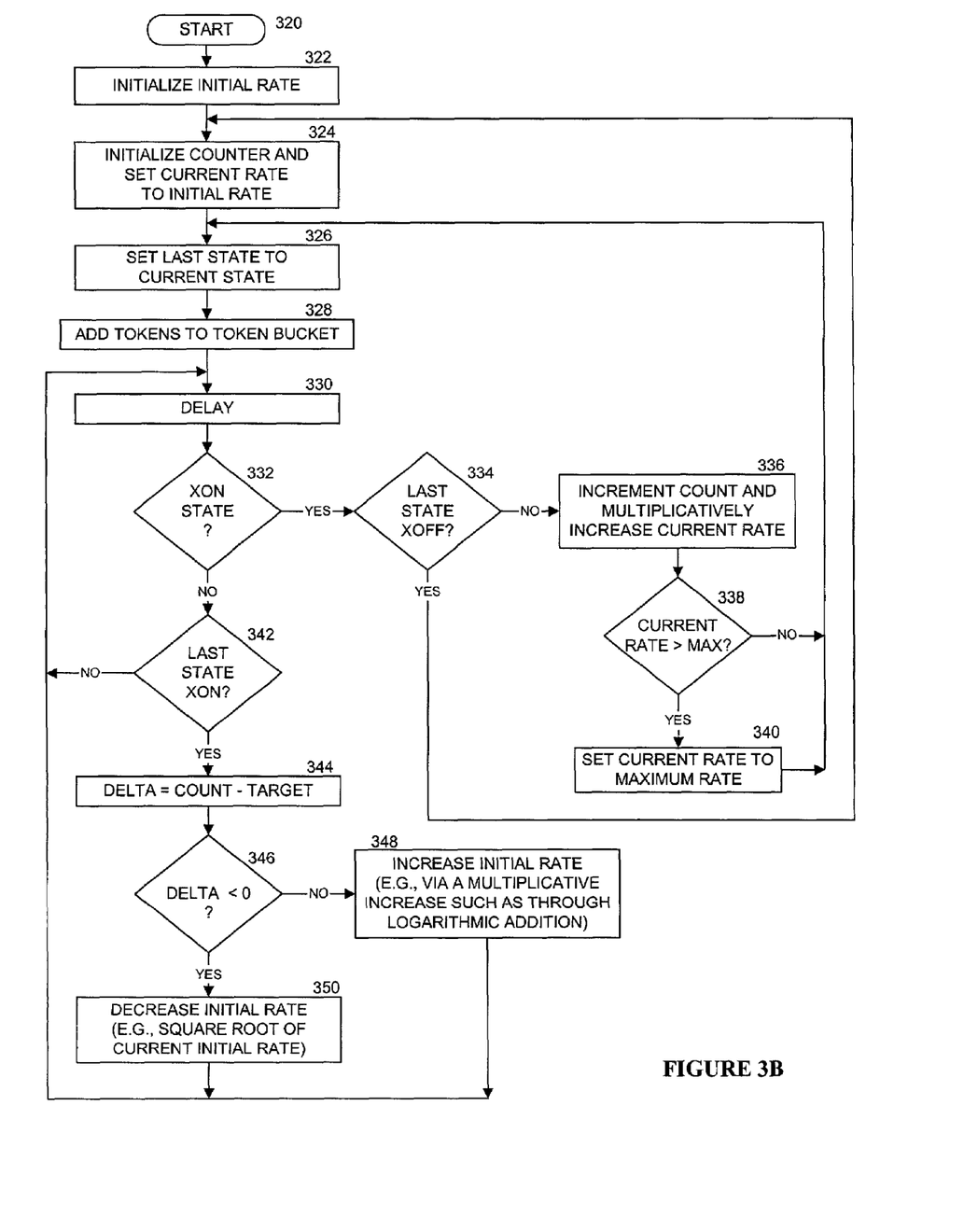
Figure 3C:
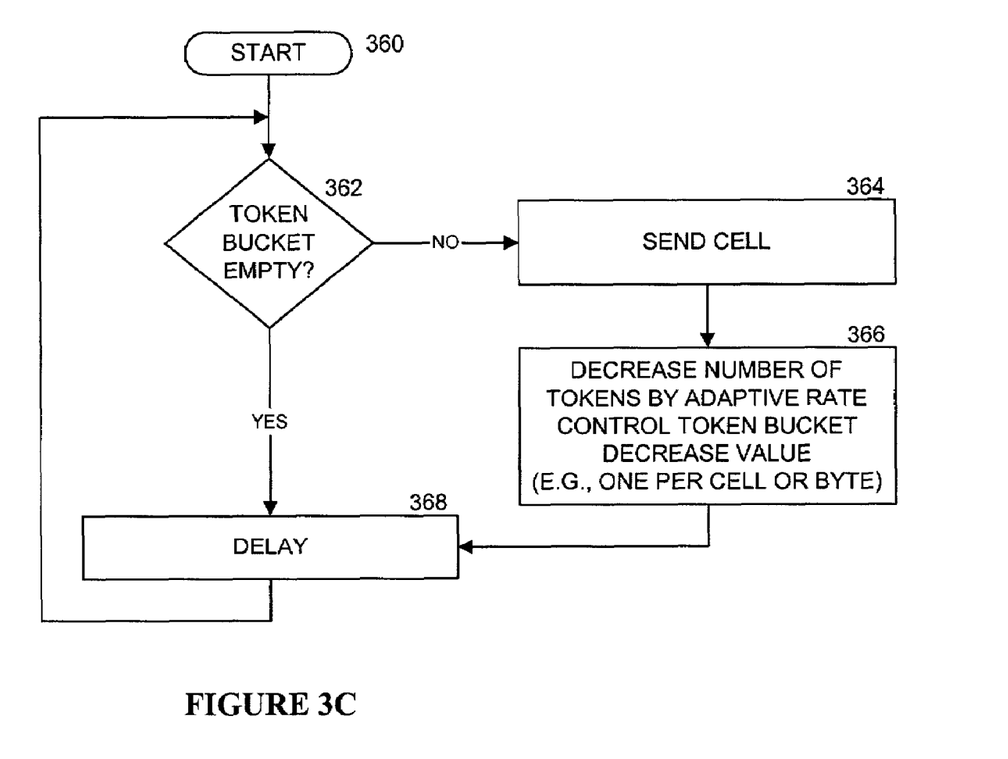

FIGS. 3A-C illustrate a set of processes of one embodiment of an adaptive rate control mechanism reactive to flow control messages in a packet switching system. The flow diagram of FIG. 3A illustrates one embodiment for maintaining and adjusting the current state of the adaptive rate control mechanism. Processing begins at process block 300, and proceeds to process block 302, wherein the initial state is set to the XON state. Next, in process block 304, a flow control signal is received. This flow control signal could be in any form or format, such as an electrical analog or digital signal, or information contained in a packet or packet header. Next, as determined in process block 306, if an XOFF signal was received, then in process block 310, the token bucket allowing packets or cells to be sent is set to the XOFF adaptive rate control token bucket value (e.g., zero, some small value, or a smaller or fractional value of the current number of tokens in the token bucket), and then in process block 312, the current state is set to the XOFF state. Otherwise, in process block 308, the current state is set to the XON state (as an XON flow control signal was received in process block 304). Processing returns to process block 304 to receive more flow control signals.

The flow diagram of FIG. 3B illustrates one embodiment of a process for determining and controlling the adaptive rate in response to flow control signal. After initialization, one embodiment adjusts the initial rate based on a measured previous XON time period. This time period could be measured in numerous ways such as using clocks and counters, including the illustrative method shown in the flow diagram of FIG. 3B.

Processing begins at process block 320, and proceeds to process block 322, wherein the initial rate (i.e., the rate to allow information to be sent upon a change from an XOFF to the XON state) is initialized. This initial rate will be modified by the flow diagram of FIG. 3B to adjust to traffic and other conditions indicated by received flow control signals or flow control states.

In process block 324, the counter used to measure the XON time period is initialized and the current rate is set to the initial rate. Next, in process block 326, the last state is maintained by setting a last state variable to the current state. Tokens are then added to the token bucket based on the value of the current rate in process block 328. In one embodiment, the number of tokens added to the token bucket is two raised to the power of the current rate (e.g., logarithmic calculations are used in one embodiment, while other embodiments calculate in a different or combination of domains). In process block 330, processing delays for a period of time ranging from zero to some large value. This delay allows the range of the counter used to measure a time period to have a decreased range of values. This delay is typically a fraction or multiple of an approximation of the feedback time delay from the generation and receipt of flow control information. In one embodiment, an approximation of the actual feedback time delay is used.

If the current state is the XON state as determined in process block 332, then, a determination is made in process block 334 to check the value of the last state. If the last state was the XON state, then processing returns to process block 324. Otherwise, the last state was not the XON state, and in process block 336, the count is incremented and the current rate is increased typically through a multiplicative increase. In one embodiment, the current rate is doubled. If the increased current rate is greater than a predetermined rate threshold as determined in process block 338, the current rate is reset to a maximum value in process block 340. Processing then returns to process block 326.

Otherwise, if the current state is not the XON state as determined in process block 332, then, a determination is made in process block 342 to check the value of the last state. If the last state was the XON state, then a delta value is determined based on the duration of the last XON time period. In process block 344, this delta value is determined by subtracting a target value of count minus the current value of count (as the time duration has been converted to a numerical count value for simplicity of implementation in one embodiment.) This target XON time can be any value. In one embodiment, the target XON time is determined based on the configuration of the packet switching system, the predicted traffic loads, simulation, and other factors. In one embodiment, the target XON time is predetermined and constant, and in one embodiment, the target XON time is varied by control software in reaction to system performance issues. In one embodiment, a value of three or four is used for the target XON time, which corresponds to three or four flow control feedback time durations.

If, as determined in process block 346, that the value of delta is less than zero (e.g., the time duration of the previous XON period was shorter than the target XON time period), then the initial rate is decreased in process block 350 by some value or formula, typically using an exponential decrease. In one embodiment, the initial rate is decreased by taking its square root (i.e., the initial rate is decreased by half). Otherwise, the value of delta is not less than zero (e.g., the time duration of the previous XON period was greater than or equal to the target XON time period), then the initial rate is increased in process block 348. In one embodiment, the value of delta is added to the current rate (e.g., the rate is multiplied by some factor of two). In one embodiment, if the value of delta is zero, then the initial rate is not adjusted. Processing returns to process block 330.

The flow diagram of FIG. 3C illustrates the processing of one embodiment for sending packets. Processing begins at process block 360, and proceeds to process block 362 wherein a determination is made whether the token bucket maintains enough tokens to send a unit of information (e.g., a cell or packet). If there are enough tokens, then the information is sent in process block 364, and the token bucket is reduced by the appropriate number of tokens in process block 366. Otherwise, processing is delayed in process block 368 by some time duration (e.g., ranging from zero to some large time duration), and processing returns to process block 362.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for adaptively control rates, the method comprising:
   receiving a start flow control signal;
   receiving a stop flow control signal;
   determining a quantitative time duration between said receipt of the start flow control signal and said receipt of the stop flow control signal;
   comparing said quantitative time duration to a predetermined threshold to produce a comparison result; and
   determining an initial rate for sending information based at least in part on said quantitative time duration and the comparison result.

2. The method of claim 1, further comprising: setting a current rate to the initial rate; and increasing the current rate.

3. The method of claim 2, wherein said increasing the current rate includes doubling a value of the current rate.

4. The method of claim 3, further comprising: comparing the current rate to a maximum rate, and setting the current rate to the maximum rate.

5. The method of claim 2, further comprising generating a set of tokens based on the value of the current rate.

6. The method of claim 1, wherein the quantitative time duration corresponds to an amount of time from said receipt of the start flow control signal until said receipt of the stop flow control signal.

7. A method for adaptively control rates, the method comprising:
receiving a start flow control signal;
receiving a stop flow control signal;
determining a time difference between the receipt of the start flow control signal and the stop flow control signal; and
exponentially decreasing an initial rate for sending information if the time difference is greater than a predetermined threshold.

8. The method of claim 7, further comprising multiplicatively increasing the initial rate if the time difference is less than a predetermined threshold.

9. The method of claim 8, wherein said multiplicatively increasing the initial rate includes doubling the initial rate.

10. The method of claim 7, wherein said exponentially decreasing the initial rate includes raising the initial rate to a one-half power.

11. The method of claim 7, further comprising multiplicatively increasing a current traffic rate.

12. The method of claim 7, wherein the time difference is a measured time duration.

13. The method of claim 7, wherein the time difference is determined based on said receipt of the start flow control signal followed in time by said receipt of the stop flow control signal.

14. An apparatus configured to adaptively control rates, the apparatus comprising:
a rate controller; and
a timing mechanism;
wherein the rate controller is configured to receive a start flow control signal and a stop flow control signal, to determine a quantitative time duration between said receipt of the start flow control signal and said receipt of the stop flow control signal, to compare said quantitative time duration to a predetermined threshold to produce a comparison result, and to determine an initial rate for sending information based at least in part on said quantitative time duration and the comparison result.

15. The apparatus of claim 14, wherein the rate controller is configured to set a current rate to the initial rate, and to increase the current rate.

16. The apparatus of claim 15, wherein said increasing of the current rate includes doubling a value of the current rate.

17. The apparatus of claim 16, wherein the rate controller is configured to compare the current rate to a maximum rate, and is configured to set the current rate to the maximum rate.

18. The apparatus of claim 15, wherein the rate controller is configured to generate a set of tokens based on the value of the current rate.

19. The apparatus of claim 14, wherein the quantitative time duration corresponds to an amount of time from said receipt of the start flow control signal until said receipt of the stop flow control signal.

20. An apparatus configured to adaptively control rates, the apparatus comprising:
means for receiving a start flow control and a stop flow control signal;
means for determining a quantitative time duration between the start flow control signal and the stop flow control signal;
means for determining an initial rate for sending information based at least in part on said quantitative time duration;
means for comparing the quantitative time duration to a predetermined threshold to produce a comparison result; and
means for adjusting the initial rate based at least in part on the comparison result.

21. The apparatus of claim 20, wherein said means for adjusting the initial rate includes means for increasing the initial rate if said quantitative time duration was less than the predetermined threshold.

22. The apparatus of claim 20, wherein said means for adjusting the initial rate includes means for decreasing the initial rate if said quantitative time duration was greater than the predetermined threshold.

23. The apparatus of claim 20, comprising means for setting a current rate to the initial rate; and means for increasing the current rate.

24. The apparatus of claim 23, wherein said means for increasing the current rate includes means for doubling a value of the current rate.

25. The apparatus of claim 24, comprising means for comparing the current rate to a maximum rate, and means for setting the current rate to the maximum rate.

26. The apparatus of claim 23, comprising means for generating a set of tokens based on the value of the current rate.

27. The apparatus of claim 20, wherein the quantitative time duration corresponds to an amount of time from said receipt of the start flow control signal until said receipt of the stop flow control signal.

28. One or more computer-readable media tangibly embodying computer-executable instructions for performing operations for adaptively control rates, said operations comprising:
identifying a quantitative time duration between a start flow control signal and a stop flow control signal;
determining an initial rate for sending information based at least in part on said quantitative time duration;
comparing the quantitative time duration to a predetermined threshold to produce a comparison result; and
adjusting the initial rate based at least in part on the comparison result.

29. The computer-readable media of claim 28, wherein said adjusting the initial rate includes increasing the initial rate it said quantitative time duration was less than the predetermined threshold.

30. The computer-readable media of claim 28, wherein said adjusting the initial rate includes decreasing the initial rate if said quantitative time duration was greater than the predetermined threshold.

31. The computer-readable media of claim 28, wherein said operations further comprise: setting a current rate to the initial rate; and increasing the current rate.

32. The computer-readable media of claim 31, wherein said increasing the current rate includes doubling a value of the current rate.

33. The computer-readable media of claim 32, wherein said operations further comprise: comparing the current rate to a maximum rate, and setting the current rate to the maximum rate.

34. The computer-readable media of claim 31, wherein said operations further comprise generating a set of tokens based on the value of the current rate.

35. The computer-readable media of claim 28, wherein the quantitative time duration corresponds to an amount of time from said receipt of the start flow control signal until said receipt of the stop flow control signal.

36. One or more computer-readable media tangibly employing computer-executable instructions for performing operations for adaptively control rates, said operations comprising:
identifying a time difference between a start flow control signal and a stop flow control signal; and
exponentially decreasing an initial rate for sending information if the time difference is greater than a predetermined threshold.

37. The computer-readable media of claim 36, wherein said operations further comprise multiplicatively increasing the initial rate if the time difference is less than a predetermined threshold.

38. The computer-readable media of claim 37, wherein said multiplicatively increasing the initial rate includes doubling the initial rate.

39. The computer-readable media of claim 36, wherein said exponentially decreasing the initial rate includes raising the initial rate to a one-half power.

40. The computer-readable media of claim 36, wherein said operations further comprise multiplicatively increasing a current traffic rate.

41. The computer-readable media of claim 36, wherein the time difference is a measured time duration.

42. A method for adaptively control rates, the method comprising:
determining a timing difference between a start flow control signal and a stop flow control signal;
determining an initial rate for sending information based at least in part on the determined timing difference; and
adjusting the initial rate based at least in part on the result of comparing the timing difference to a predetermined threshold.

43. The method of claim 42, wherein said adjusting the initial rate includes increasing the initial rate if the timing difference was less than the predetermined threshold.

44. The method of claim 42, wherein said adjusting the initial rate includes decreasing the initial rate if the timing difference was greater than the predetermined threshold.

45. An apparatus configured to adaptively control rates, the apparatus comprising:
a rate controller; and
a timing mechanism;
wherein the rate controller is configured to determine a timing difference between a start flow control signal and a stop flow control signal to determine an initial rate for sending information based at least in part on the determined timing difference, and to adjust the initial rate based at least in part on a comparison of the timing difference to a predetermined threshold.

46. The apparatus of claim 45, wherein said adjusting the initial rate includes increasing the initial rate if the timing difference was less than the predetermined threshold.

47. The apparatus of claim 45, wherein said adjusting the initial rate includes decreasing the initial rate if the timing difference was greater than the predetermined threshold.

* * * * *

UNITED STATES PATENT AND TRADEMARK OFFICE
CERTIFICATE OF CORRECTION

PATENT NO.        : 7,269,139 B1
APPLICATION NO.   : 09/894199
DATED             : September 11, 2007
INVENTOR(S)       : Williams, Jr. et al.

It is certified that error appears in the above-identified patent and that said Letters Patent is hereby corrected as shown below:

Col. 8, line 52, replace "rate it said" with -- rate if said --

Col. 9, line 9, replace "employing" with -- embodying --

Signed and Sealed this

Eighth Day of December, 2009

David J. Kappos
*Director of the United States Patent and Trademark Office*